United States Patent
Liu

(10) Patent No.: US 9,196,190 B2
(45) Date of Patent: Nov. 24, 2015

(54) DISPLAY MODULE, ELECTRONIC DEVICE AND DISPLAY CONTROL METHOD

(75) Inventor: Junfeng Liu, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 90 days.

(21) Appl. No.: 14/003,416

(22) PCT Filed: Mar. 13, 2012

(86) PCT No.: PCT/CN2012/072242
§ 371 (c)(1),
(2), (4) Date: Sep. 5, 2013

(87) PCT Pub. No.: WO2012/122928
PCT Pub. Date: Sep. 20, 2012

(65) Prior Publication Data
US 2013/0342428 A1    Dec. 26, 2013

(51) Int. Cl.
*G09G 3/20* (2006.01)
*G06F 3/14* (2006.01)
*G06F 1/16* (2006.01)
*G06F 3/041* (2006.01)

(52) U.S. Cl.
CPC ............ *G09G 3/2092* (2013.01); *G06F 1/1626* (2013.01); *G06F 1/1637* (2013.01); *G06F 1/1647* (2013.01); *G06F 3/0412* (2013.01); *G06F 3/1446* (2013.01); *G09G 2300/023* (2013.01); *G09G 2340/10* (2013.01); *G09G 2340/12* (2013.01)

(58) Field of Classification Search
None
See application file for complete search history.

(56) References Cited

U.S. PATENT DOCUMENTS

| 8,210,922 | B2 * | 7/2012 | Williams et al. | 463/20 |
| 8,493,285 | B2 * | 7/2013 | Kuhn | 345/4 |
| 8,890,771 | B2 * | 11/2014 | Pance | 345/4 |
| 2005/0052341 | A1 * | 3/2005 | Henriksson | 345/4 |

FOREIGN PATENT DOCUMENTS

| CN | 1506732 A | 6/2004 |
| CN | 1891318 A | 1/2007 |
| CN | 101471974 A | 7/2009 |
| CN | 101727785 A | 6/2010 |

OTHER PUBLICATIONS

International Search Report, PCT/CN2012/072242.

* cited by examiner

*Primary Examiner* — Kenneth B Lee, Jr.
(74) *Attorney, Agent, or Firm* — Kinney & Lange, P.A.

(57) ABSTRACT

The present invention provides a display module, an electronic device and a display control method. The display module may comprise: a first display unit disposed in a first area, configured to display first image information, wherein the first display unit has a first transmittance, and the first transmittance is higher than a specific transmittance; a second display unit disposed in a second area, configured to display second image information, wherein a first light reflected by the second display unit or a second light generated by the second display unit is able to transmit through the first display unit. By using the display module, a user can see the second image information presented by the second display unit while watching the first image information presented by the first display unit. A different display effect may be presented by combining the first display unit and the second display unit.

10 Claims, 7 Drawing Sheets

DISPLAY MODULE, ELECTRONIC DEVICE AND DISPLAY CONTROL METHOD

FIELD OF THE INVENTION

The present disclosure generally relates to an electronic device, and more particularly, to a display module, an electronic device and a display control method.

BACKGROUND OF THE INVENTION

In a prior art, an electronic device having a display function generally has one display screen only, and all of information output from the electronic device may be displayed by the display screen.

Additionally, some electronic devices may be provided with a plurality of display screens. Different screens may display different output contents of the electronic device. A flip type mobile phone may be taken as an example in the following. An inner surface and an outer surface of an upper phone body for flip opening may be provided with respective display screens, wherein the display screen of the outer surface may be used for displaying a time and an incoming call information, and the display screen of the inner surface may be used for displaying contents such as image information, a telephone directory and short messages. A plate type mobile phone may be taken as an example in the following. A front surface and a rear surface of the mobile phone may be provided with respective display screens, or one and the same surface of the mobile phone may be provided with a plurality of display screens etc.

Generally, current approaches of providing the electronic device with the plurality of display screens includes: arranging the display screens respectively on different surfaces; and arranging different display screens respectively on different areas of one and the same surface.

Therefore, the prior art lacks such an electronic device that can be provided with a plurality of display screens on one and the same display window, so as to display contents respectively on each of display screens and also to display contents on a combination of the display screens for achieving a plurality of display effects.

SUMMARY OF THE INVENTION

The present disclosure provides a display module, an electronic device and a display control method. The display module may be provided with at least two layers of display screens, and may perform display in one and the same display window of the electronic device so as to achieve a plurality of display effects.

An aspect of embodiments of the present invention provides a display module, comprising:

a first display unit disposed in a first area, configured to display first image information, wherein the first display unit has a first transmittance, and the first transmittance is higher than a specific transmittance;

a second display unit disposed in a second area, configured to display second image information, wherein a first light reflected by the second display unit or a second light generated by the second display unit is able to transmit through the first display unit.

Preferably, the first display unit comprises:

a first light-emitting unit, configured to generate a third light;

a first image unit, through which the third light transmits, so that the first image unit generates the first image information.

Preferably, the second display unit comprises:

a second light-emitting unit, configured to generate the second light;

a second image unit, through which the second light transmits, so that the second image unit generates the second image information.

Preferably, the second image unit comprises:

a second image unit, configured to generate the second image information, wherein an incident light is reflected by the second image unit to form the first light.

Preferably, the second display unit has a second transmittance, and wherein the second transmittance is higher than the specific transmittance.

Preferably, the display module further comprises:

a first sensing unit disposed in a third area, wherein the first area is disposed between the second area and the third area, and the first sensing unit has a third transmittance higher than the specific transmittance, and wherein the first sensing unit is configured to sense an operation of an operation body on the first image information, and/or sensing an operation of the operation body on the second image information.

Preferably, the display module further comprises:

a first sensing unit disposed in a third area, wherein the first area is disposed between the second area and the third area, and the first sensing unit has a third transmittance higher than the specific transmittance, and wherein the first sensing unit is configured to sense an operation of an operation body on the first image information;

a second sensing unit disposed in a fourth area, wherein the second area is disposed between the first area and the fourth area, and wherein the second sensing unit is configured to sense an operation of the operation body on the second image information.

Preferably, the second sensing unit has a fourth transmittance higher than the specific transmittance, Another aspect of embodiments of the present invention provides an electronic device, comprising:

a housing forming an accommodation space, the housing including a first outer surface having a first opening;

a display module disposed in the accommodation space and comprising:

a first display unit disposed in a first area of the accommodation space and located at the first opening, configured to display first image information, wherein the first display unit has a first transmittance, and the first transmittance is higher than a specific transmittance;

a second display unit disposed in a second area of the accommodation space, configured to display second image information, wherein a first light reflected by the second display unit or a second light generated by the second display unit is able to transmit through the first display unit.

Preferably, the electronic device further comprises:

a first sensing unit disposed in a third area of the accommodation space and exposed via the first opening, wherein the first area is disposed between the second area and the third area, and the first sensing unit has a third transmittance higher than the specific transmittance, and wherein the first sensing unit is configured to sense an operation of an operation body on the first image information;

a second sensing unit disposed in a fourth area of the accommodation space, wherein the second area is disposed between the first area and the fourth area, and wherein the second sensing unit is configured to sense an operation of the operation body on the second image information.

Preferably, the housing comprises a second outer surface having a second opening, and the second sensing unit is exposed via the second opening; and wherein the second display unit has a second transmittance higher than the specific transmittance, and the second sensing unit has a fourth transmittance higher than the specific transmittance.

Preferably, the electronic device further comprises:

a first sensing unit disposed in a third area of the accommodation space, wherein the first area is disposed between the second area and the third area, and the first sensing unit has a third transmittance higher than the specific transmittance, and wherein the first sensing unit is configured to sense an operation of an operation body on the first image information, and/or sensing an operation of the operation body on the second image information.

Preferably, the first sensing unit comprises:

a sensing component, configured to sense first position information of the operation body with respect to the first image information and second position information of the operation body with respect to second first image information;

a detection component, configured to detect control information of the operation body.

Preferably, the electronic device further comprises:

a control unit, configured to determine a control object according to the control information, so that the control object responds to an operation of the operation body on the first position information and/or the second position information.

Preferably, the detection component comprises a pressure sensing module configured to sense a pressure value of the operation body, the control information being the pressure value;

the control unit determines whether the pressure value is larger than a preset pressure value; enables the second display unit to display fourth image information in response to the second position information, when the pressure value is larger than the preset pressure value, wherein the fourth image information is different from the second image information; and enables the first display unit to display third image information in response to the operation on the first position information, when the pressure value is less than the preset pressure value, wherein the third image information is different from the first image information.

Preferably, the detection component comprises an operation control detection module, configured to determine whether there are operation controls corresponding to the first position information and the second position information respectively, the control information being information indicating that an operation control exists; and when the operation control detection module determines that there is the operation control corresponding to the first position information but there is not the operation control corresponding to the second position information, the control unit enables the first display unit to display the third image information in response to the operation control corresponding to the first position information, wherein the third image information is different from the first image information;

when the operation control detection module determines that there is the operation control corresponding to the second position information but there is not the operation control corresponding to the first position information, the control unit enables the second display unit to display the fourth image information in response to the operation control corresponding to the second position information, wherein the fourth image information is different from the second image information.

Preferably, the detection component comprises' a mode determination module configured to determine whether a first selection mode or a second selection mode provided to the operator is selected, the control information indicating a selected mode;

wherein when the mode determination module determines that the first selection mode is selected, the control unit enables the first display unit to display the third image information in response to the operation control corresponding to the first position information, wherein the third image information is different from the first image information;

wherein when the mode determination module determines that the second selection mode is selected, the control unit enables the second display unit to display the fourth image information in response to the operation control corresponding to the second position information, wherein the fourth image information is different from the second image information.

An embodiment of the present invention further provides an electronic device, comprising:

a housing forming an accommodation space, the housing including a first outer surface having a first opening;

a first display sensing unit disposed in a first area of the accommodation space and located at the first opening, configured to display first image information and sense an operation of an operation body on the first image information, wherein the first display sensing unit has a fifth transmittance higher than a specific transmittance;

a second display unit disposed in a second area of the accommodation space, configured to display second image information, wherein a first light reflected by the second display unit or a second light generated by the second display unit is able to transmit through the first display unit.

Preferably, the first display sensing unit comprises:

a first display component configured to display the first image information, the first display component having a first transmittance higher than the specific transmittance;

a first sensing component configured to sense the operation of the operation body on the first image information, the first sensing component having a third transmittance higher than the specific transmittance, wherein the first sensing component comprises a first sensing layer and a second sensing layer parallel to the first sensing layer, and the first display component is disposed between the first sensing layer and the second sensing layer.

An embodiment of the present invention further provides an electronic device, comprising:

a housing forming an accommodation space, the housing including a first outer surface having a first opening;

a first display sensing unit disposed in a first area of the accommodation space and located at the first opening, comprising:

a first display component configured to display first image information, the first display component having a first transmittance higher than a specific transmittance;

a first sensing unit configured to sense an operation of an operation body on the first image information, wherein the first sensing component has a third transmittance higher than the specific transmittance, the first sensing component comprises a first sensing layer and a second sensing layer parallel to the first sensing layer, and the first display component is disposed between the first sensing layer and the second sensing layer;

a second display sensing unit disposed in a second area of the accommodation space, comprising:

a second display component configured to display second image information, wherein a first light reflected by the second display unit or a second light generated by the second display unit is able to transmit through the first display sensing unit;

a second sensing component configured to sense an operation of the operation body on the second image information, wherein the second sensing component comprises a third sensing layer and a fourth sensing layer parallel to the third sensing layer, and the second display component is disposed between the third sensing layer and the fourth sensing layer.

An embodiment of the present invention further provides a display control method, comprising steps of:

displaying first image information on a first display unit, and displaying second image information on a second display unit, wherein the first display unit has a first transmittance higher than a specific transmittance, and a first light reflected by the second display unit or a second light generated by the second display unit is able to transmit through the first display unit;

detecting an operation of an operation body;

enabling the first display unit to display third image information in response to the operation, wherein the third image information is different from the first image information; or enabling the second display unit to display fourth image information, wherein the fourth image information is different from the second image information; or enabling the second display unit to display the fourth image information, while enabling the first display, unit to display the third image information.

Preferably, the step of detecting the operation of the operation body comprises:

obtaining first position information of the operation relative to the first display unit, and second position information of the operation relative to the second display unit;

detecting control information of the operation, and determining an control object of the operation according to the control information.

Preferably, the step of responding to the operation comprises steps of:

enabling the first display unit to display the third image information, when the control object is determined to be the first display unit;

enabling the second display unit to display the fourth image information, when the control object is determined to be the second display unit;

enabling the second display unit to display the fourth image information while enabling the first display unit to display the third image information, when the control objects are determined to be the first display unit and the second display unit.

Preferably, the step of detecting the control information of the operation and determining the control object of the operation according to the control information comprises steps of:

obtaining mode selection action information of an operator, and determining whether a first selection mode or a second selection mode of the operator is selected, the control information indicating the selected mode;

determining the control object to be the first display unit, when the first selection mode is selected;

determining the control object to be the second display unit, when the second selection mode is selected;

determining the control objects to be the first display unit and the second display unit, when both the first selection mode and the second selection mode are selected.

Preferably, the step of responding to the operation comprises steps of:

enabling the first display unit to display the third image information while enabling the second display unit to display the fourth image information, when the control object is determined to be the first display unit, wherein the third image information is associated with the fourth image information;

enabling the second display unit to display the fourth image information while enabling the first display unit to display the third image information, when the control object is determined to be the second display unit, wherein the third image information is associated with the fourth image information.

At least one of the above technical solutions according to embodiments of the present invention may have beneficial effects as follows:

the electronic device may be provided with a first display unit and a second display unit which are stacked, and may display via one and the same display window on the electronic device so as to display different contents respectively on different display units in different frequency, brightness, contrast, color, and thus to achieve different display effects;

a display module may be provided with multiple layers of display units, and may have a touch-sensitive operation function. Even if only one sensing components is arranged, it may still sense touch operations of an operation body on two different display units. According to different operation manners of the operation body, different display units may be enabled to respond to the operations of the operation body.

DETAILED DESCRIPTION OF PREFERRED EMBODIMENTS

Hereinafter, embodiments of the present invention will be detailed with reference to the drawings which show examples thereof. It should be understood that these descriptions are only illustrative but do not limit the scope of the present invention.

Figure 1:
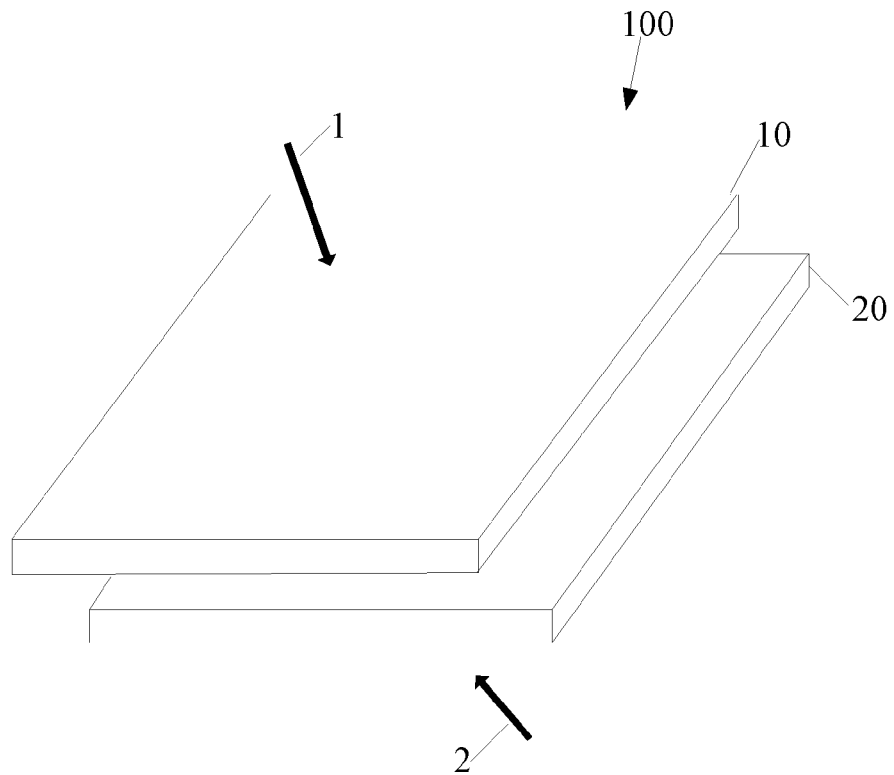
FIG. 1 is an illustrative structure diagram of a display module according to an embodiment of the present invention.

FIG. 1 is an illustrative structure diagram of a display module 100 according to an embodiment of the present invention. The display module 100 may comprise:

a first display unit 10 disposed in a first area, configured to display first image information, wherein the first display unit 10 has a first transmittance, and the first transmittance is higher than a specific transmittance;

a second display unit 20 disposed in a second area, configured to display second image information, wherein a first light reflected by the second display unit 20 or a second light generated by the second display unit 20 is able to transmit through the first display unit 10.

The display module 100 may be provided with the first display unit 10 and the second display unit 20, and may perform display in one and the same display window on the electronic device. The first display unit 10 has a transmittance, and the second image information on the second display unit 20 may be displayed through the first display unit 10. Therefore, when a user views the first image information presented by the first display unit 10 along a direction 1 as indicated by an arrow, he may view the second image information presented by the second display unit 20 at the same time. A combination of the first display unit 10 and the second display unit 20 may present different display effects.

Here, the "specific transmittance" as mentioned may refer to a transmittance satisfying a certain light transmittance requirement. A particular light transmittance requirement may be determined dependent on the display effect finally needed to be achieved by the display module. Therefore, a value of the "specific transmittance" may be set according to the display design requirement. The display unit 10 has the first transmittance higher than the "specific transmittance", which may satisfy the light transmittance requirement for the display effect to be implemented.

Hereinafter, structures of various units in the display module according to the embodiment of the present invention will be described in detail.

In the display module 100, the first display unit 10 has the first transmittance higher than the specific transmittance, and the second display unit 20 is opaque.

The first display unit 10 may have the first transmittance higher than the specific transmittance, i.e., for forming a transparent display unit. Therefore, the detailed structure of the first display unit 10 is simply described here.

Figure 2:
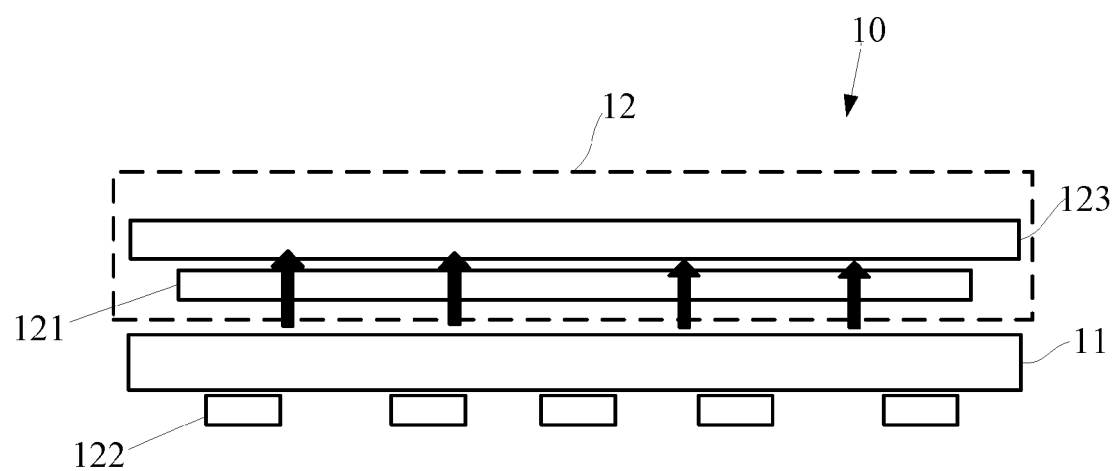
FIG. 2 is an illustrative structure diagram of a first display unit in the display module according to a first embodiment of the present invention.

FIG. 2 is an illustrative structure diagram of the first display unit 10 according to the first embodiment of the present invention. Referring to FIG. 2, the first display unit 10 may comprise:

a first light-emitting unit 11, configured to generate a third light;

a first image unit 12, through which the third light generated by the first light-emitting unit 11 may transmit, so that the first image unit 12 may generate the first image information.

The first display unit 10 may particularly be an OLED (Organic Light Emitting Diode) display unit, which utilizes an external bias to cause electron holes and electrons to leave a positive electrode and a negative electrode respectively and to meet at the organic light emitting layer to generate a light-emitting effect.

Therefore, in the first display unit 10, the first light-emitting unit 10 is an OLED unit having a transmittance higher than the specific transmittance. As shown in FIG. 2, the first image unit 12 may further comprise an anode layer 121, a cathode layer 122 and a thin film layer 123, wherein the anode layer 121 may be an ITO (Indium-Tin Oxide) conductive film, and the cathode layer 122 may be a metal electrode containing metal such as Mg, Al, Li etc; the anode layer 121 and the cathode layer 122 may be arranged on an upper and an lower sides of the first light-emitting unit 10 respectively, and the thin-film layer 123 may be arranged in a light-emitting radiation direction of the first light-emitting unit 10, e.g. above the first light-emitting unit 10 as shown in FIG. 2.

With the OLED unit, i.e., the first light-emitting unit 11, in the first display unit 10 as shown in FIG. 2, a plurality of display effects may be presented on the thin film layer of the first image unit 12. When the user views the first display unit 10 at an outer side of the thin film layer 123, he may view the first image information presented on the first display unit 10.

Figure 3:
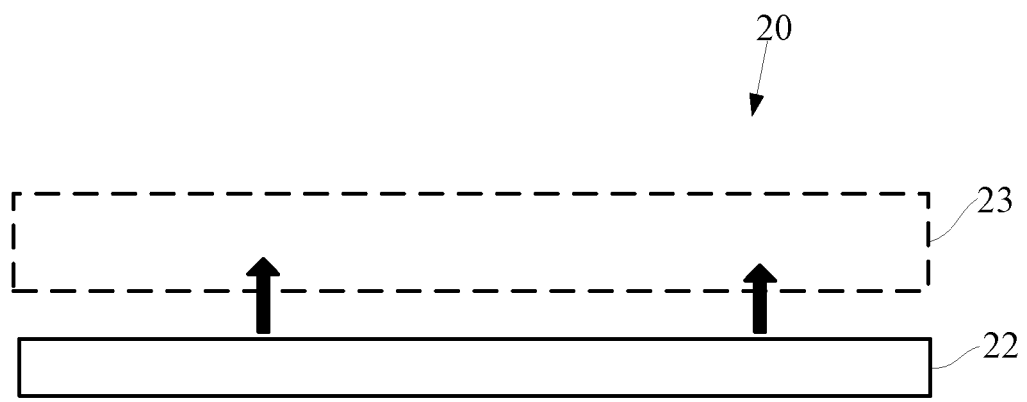
FIG. 3 is a first type of illustrative structure diagram of a second display unit in the display module according to the first embodiment of the present invention.

As will understood by the skilled in the art, the OLED unit layer, the ITO conductive film, the thin film layer, the metal electrode in the OLED display unit may be made of light transmittance materials, forming a display unit capable of achieving the specific transmittance and displaying the image information, The second display unit 20 may be an E-ink display screen or a common LCD (Liquid Crystal Display) screen. As shown in FIG. 3, taking the common LCD screen as an example, the second display unit 20 may comprise:

a second light-emitting unit 22, configured to generate the second light;

a second image unit 23, through which the second light generated by the second light-emitting unit 22 may transmit, so that the second image unit may generate the second image information.

In the second display unit 20 of this structure, the second light-emitting unit 22 is not limited to be made of light transmittance material. The second light generated by the second light-emitting unit 22 can arrive at the first display unit 10 after transmitting through the second image unit 23. Since the first display unit 10 has the first transmittance, the second light is enabled to be transmitted through the first display unit 10 again and arrives at eyes of the user viewing above the first display unit 10, so that the user may view the second image information on the second display unit 20 through the first display unit 10.

Figure 4:
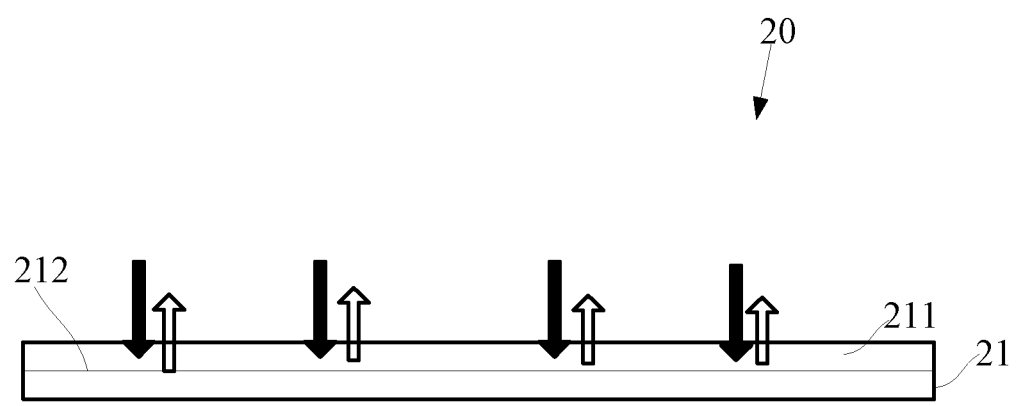
FIG. 4 is a second type of illustrative structure diagram of the second display unit in the display module according to the first embodiment of the present invention.

Additionally as shown in FIG. 4, the second display unit 20 being the E-ink display screen may be taken as an example, and the structure of the second display unit 20 will be described. When the second display unit 20 is the E-ink display screen, it may form a reflective display screen. The second display unit 20 may comprise:

a second image unit 21 comprising a display layer 111 and a reflective surface 212, wherein the display layer 111 may be used for generating the second image information, and the reflective surface 212 may be used for reflecting light to form the first light. The external light of the display module 100 arriving at the reflective surface 212 may reflect upward directly to form the first light. Since the first display unit 10 has the first transmittance, the first light may transmit through the first display unit 10 to enable the user to view the image displayed by the display layer 21 of the second image unit 21.

The skilled in the art should understand the structure and working principle of the E-ink display screen or the common LCD screen, and thus the descriptions thereof will be omitted here.

In the display module of the first embodiment of the present invention, the second display unit 20 disposed below the first display unit 10 may form an opaque display screen, and the first display unit 10 and the second display unit 20 are stacked in a vertical direction. The first light reflected by the second display unit 20 or the second light generated by the second display unit 20 may transmit through the first display unit 10 and arrive at the eyes of the user above the first display unit 20. Therefore, when the user views the first image information presented on the first display unit 10, he may view the second display information presented on the second display unit 20 at the same time.

Additionally, in the display module 100 according to the second embodiment of the present invention, the first display unit 10 has the first transmittance higher than the specific transmittance, and the second display unit 20 has the second transmittance higher than the specific transmittance, which may satisfy the light transmittance requirements for the display effect to be implemented. The first transmittance and the second transmittance may be the same transmittance, and may be different transmittances. Such a principle that the transmittance may satisfy a light transmittance requirement and the respective transmittances may be the same or different is also apply to "third transmittance", "fourth transmittance", "fifth transmittance" and "sixth transmittance" as mentioned below.

The structure of the first display unit 10 may refer to the description of the first embodiment, and the description thereof will be omitted here.

The structure of the second display unit 20 having the second transmittance may refer to the structure of the first display unit 10, i.e., as shown in FIG. 2, the second display unit 20 may be the OLED display unit, and may comprise:

a second light-emitting unit, which is a OLED having a transmittance higher than the specific transmittance, and is configured to generate the second light;

a second image unit configured to generate the second image information, wherein the second image unit comprises: the ITO conductive film, the metal electrode and the thin film layer, wherein the ITO conductive film, the metal electrode and the thin film layer may be made of light transmittance materials respectively, and the second light generated by the second light-emitting unit may transmit through the second image unit, so that the second image information may be generated on the second image unit.

The second light transmitting through the second image unit may continue to transmit through the first display unit 10 above the second display unit 20, so that the user may view the second image information presented on the second image unit.

In the display module 100 according to the second embodiment of the present invention, both the first display unit 10 and the second display unit 20 may form a transparent display screen structure. Therefore, when viewing along the direction indicated by Arrow 1 as shown in FIG. 1, the user may view both the first image information presented by the first display unit and the second image information presented by the second image unit.

In the display module 100 according to the second embodiment of the present invention, the first image information and the second image information may be displayed in the direction indicated by Arrow 1 as shown in FIG. 1. Thus, when viewing in the direction as indicated by Arrow 1 in FIG. 1, the user may view the first and the second image information by facing a front surface. Additionally, since both the first display unit 10 and the second display unit 20 may satisfy the light transmittance requirement, the user may also view the first and the second image information at the rear when viewing along the direction as indicated by Arrow 2 in FIG. 1.

On the other hand, the display module 100 according to the second embodiment of the present invention may achieve a dual-face viewing effect. When the user views the display along the direction as indicated by Arrow 1 in FIG. 1, the first and the second image information are enabled to be displayed toward Arrow 1. Thus, when the user views the display along the direction as indicated by Arrow the first and the second image information are enabled to be displayed toward Arrow 2. That is, the user may view the first and the second image information by facing a front surface along the directions as indicated by both Arrow 1 and Arrow 2.

Furthermore, when the contents of the first image information or the second image information viewed by facing the front surface and the rear surface are identical, the first display unit 10 or the second display unit 20 of the display module 100 is not necessary to change the display direction of the displayed image information.

When the contents of the first image information or the second image information viewed by facing the front surface and the rear surface are different, the first display unit 10 or the second display unit 20 needs to change the display direction of the displayed image information according to the user's viewing direction.

According to the embodiment of the present invention, a sensor, such as a camera for face recognition in order to detect a viewing angle of the user, may be set on the electronic device provided with the display module 100 of the second embodiment. When it is detected that the user is viewing along the direction as indicated by Arrow 1, the first image information and the second image information are enabled to display toward the direction as indicated by Arrow 1. When it is detected that the user is viewing along the direction as indicated by Arrow 2, the first image information and the second image information are enabled to display toward the direction as indicated by Arrow 2.

The number of the set cameras may be one. The camera may be arranged above the first display unit 10, and may take a view toward a direction opposite to the direction as indicated by Arrow 1. When the user's image is captured, it shows that the user is viewing along the direction as indicated by Arrow 1. When the user's image is not captured, it shows that the user is viewing along the direction as indicated by Arrow 2. Similarly, the camera may also be arranged below the second display unit 20, and may take a view toward a direction opposite to the direction as indicated by Arrow 2.

The number of the set cameras may be two. First of the cameras may be arranged above the first display unit 10, and may take a view toward the direction opposite to the direction as indicated by Arrow 1, and second one may be arranged above the second display unit 20, and may take a view toward the direction opposite to the direction as indicated by Arrow 2. When the user's image is captured by the first camera, it shows that the user is viewing along the direction as indicated by Arrow 1, and the first image information and the second image information are enabled to be displayed toward the direction as indicated by Arrow 1. When the user's image is captured by the second camera, it shows that the user is viewing along the direction as indicated by Arrow 2, and the first image information and the second image information are enabled to be displayed toward the direction as indicated by Arrow 2. When the user's image is captured by both of the two cameras, the first image information is enabled to be displayed toward the direction as indicated by Arrow 1, and the second image information is enabled to be displayed toward the direction as indicated by Arrow 2.

In the first and the second embodiments of the present invention, the display module including two display units are taken as an example. As will be understood by the skilled in the art, based on the principle of the present invention, the number of the display units is not limited to two. For example, three or more display units may be included, and various display units may be arranged in parallel from top to bottom or from left to right and may display images toward the same direction, as shown in FIG. 1. All of the display units other than the last display unit may form the display units having transmittances higher than the specific transmittance, and thus the image displayed on various display units is enabled to be viewed.

As will be understood by the skilled in the art, the display units arranged in the display module are not limited to be parallel mutually. Substantial parallel or contacting connection by mutual jointing may also be possible.

When the display module of the embodiments of the present invention is set on the electronic device, the control unit of the electronic device may perform a display control, so that different contents may be displayed respectively on different display units in different frequencies, brightness, contrast, colors, and thus different display effects may be achieved. The setting structure of the display module may change traditional display mode of a single-layer display screen, and may form a multi-layer display architecture physically so as to be a basis of 3D display.

Additionally, the display module of the embodiments of the present invention may further have a touch-sensitive function, so as to control an operation control on the image displayed on the display unit by a touching operation.

Figure 5:
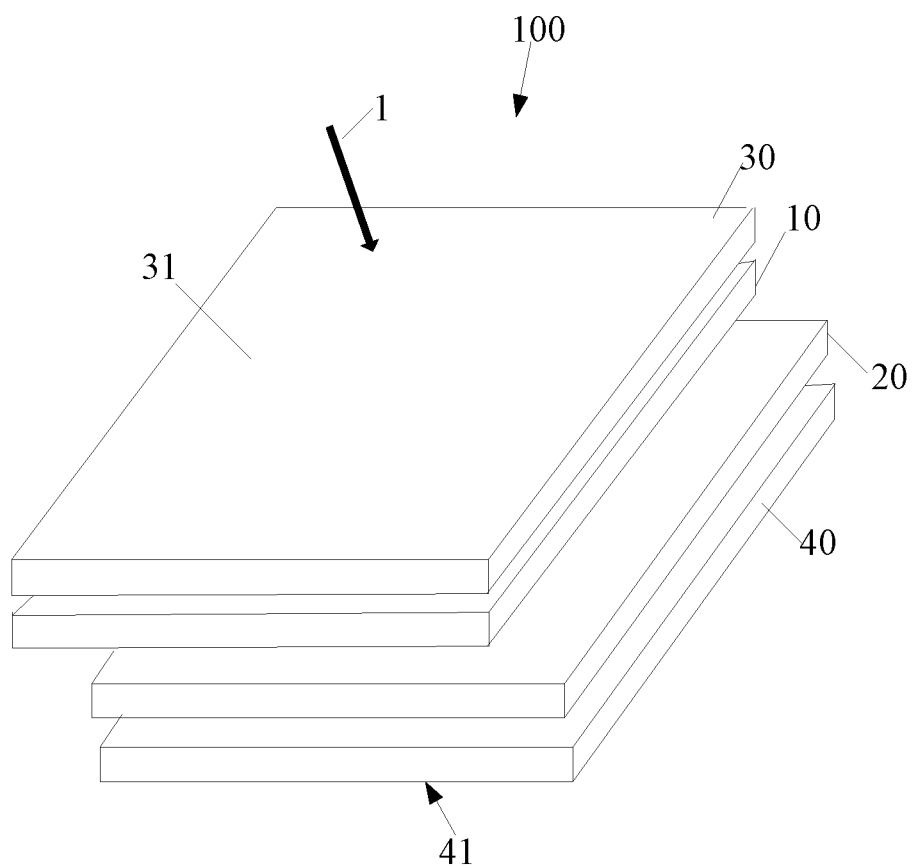
FIG. 5 is an illustrative structure diagram of a display module according to a third embodiment of the present invention.

Therefore, as shown in FIG. 5, the display module 100 according to the third embodiment of the present invention may comprise a first display unit 10, a second display unit 20, a first sensing unit 30 and a second sensing unit 40.

The first display unit 10 and the second display unit 20 may be arranged in parallel from top to bottom. The first display unit 10 may have the first transmittance higher than the specific transmittance. The first light reflected by the second display unit 20 or the second light generated by the second display unit 20 may transmit through the first display unit 10, so that the user may view the second image information displayed by the second display unit 20 while the user views the first image information displayed by the first display unit 10. The particular structures of the first display unit 10 and the second display unit 20 may refer to descriptions thereof in the first and the second embodiments, and the descriptions thereof will be omitted here.

The first display unit 10 and the second display unit 20 may be in parallel from top to bottom. The first display unit 10 and the second display unit 20 may be arranged in the first area and the second area respectively, and the first sensing unit 30 may be arranged in the third area, in which the first area is located between the second area and the third area, as shown in FIG. 5. The first sensing unit 30 may be set above the first display unit 10, and may be used for sensing the operation of the operation body on the first image information of the first display unit 10.

As will be understood by the skilled in the art, in the touch-sensitive display module, the sensing unit is generally made of the light-transmittance material, in order that the user may view the display image under the sensing unit. Similarly, in the third embodiment of the present invention, the first sensing unit 30 may have the third transmittance higher than the specific transmittance. When the first sensing unit 30 is arranged above the first display unit 10, the user may view the first image information displayed by the first display unit 10, and at the same time may view the second image information displayed by the second display unit 20 through the first sensing unit 30 and the first display unit 10.

Performing a touch-sensitive operation on the first image information displayed on the first display unit 10 by the first sensing unit 30 may comprise: sensing by a sensing surface 31 a touch position of the operation body when the operation body touches the first sensing unit 30, and performing an operation corresponding to the operation control at a corresponding position, according to the corresponding position of the touch position on the first image information of the second display unit 10.

The second sensing unit 40 may be arranged in the fourth area. The second area is positioned between the first area and the fourth area, as shown in FIG. 5. The second sending unit 40 may be arranged under the second display unit 20 which positioned between the second sensing unit 40 and the first display unit 10. A sensing surface 41 is provided on a underlying surface of the second sensing unit 40 for sensing the operation of the operation body on the second image information displayed on the second display unit 20.

Performing a touch-sensitive operation on the second image information displayed on the second display unit 20 by the second sensing unit 40 may comprise: sensing by a sensing surface 41 a touch position of the operation body when the operation body touches the second sensing unit 40, and performing an operation corresponding to the operation control at a corresponding position, according to the corresponding position of the touch position on the second image information displayed on the second display unit 20.

When the electronic device is provided with the display module 100 of the third embodiment, the display module 100 may be arranged at a first opening of the first surface of the electronic device's housing. At the first opening, the first sensing unit 30, the first display unit 10, the second display unit 20 and the second sensing unit 40 are arranged sequentially from top to bottom, and the first sensing unit 30 is exposed by the opening. The user may view the image displayed by the first display unit 10 and the second display unit 20 via the first opening. Additionally, the user may touch a part of the sensing surface 31 of the first sensing unit 30 which is exposed via the first opening, and perform the touching operation on the first image information displayed by the first display unit 10. The second sensing unit 40 may be arranged at a second surface of the electronic device's housing which is opposite to the first surface, and may be exposed via a second opening on the second surface. The user may touch a part of the sensing surface 41 of the second sensing unit 40 which is exposed via the second opening, and perform the touching operation on the second image information displayed by the second display unit 20.

Additionally, the sensing surface of the second sensing unit 40 may be arranged directly on the second surface of the electronic device's housing. The sensing surface is not limited to be transparent. When the user may touch the sensing surface on the second surface of the electronic device's housing, the second sensing unit 40 may also sense the touch operation, and thus the second image information displayed by the second display unit may be touch-controlled.

When the second sensing unit 40 is arranged at the second opening of the second surface of the electronic device's housing and thus the second sensing unit 40 and the second display unit 20 need to be exposed via the second opening, the second sensing unit 40 needs to have a fourth transmittance higher than the specific transmittance. Otherwise, the transmittance requirement for the second sensing unit 40 is not limited.

Therefore, when the display module according to the third embodiment of the present invention is used, the user may perform the touch operation on the first sensing unit 30 at the first surface of the housing, and may touch control the first image information displayed by the first display unit 10. When the user may perform the touch operation on the second sensing unit 40 at the second surface of the housing, he may touch control the second image information displayed by the second display unit 20.

In yet another aspect, the display module 100 according to the fourth embodiment of the present invention may perform a touch operation on the first display unit 10 and the second display unit 20 in a manner different from the third embodiment.

Figure 6:
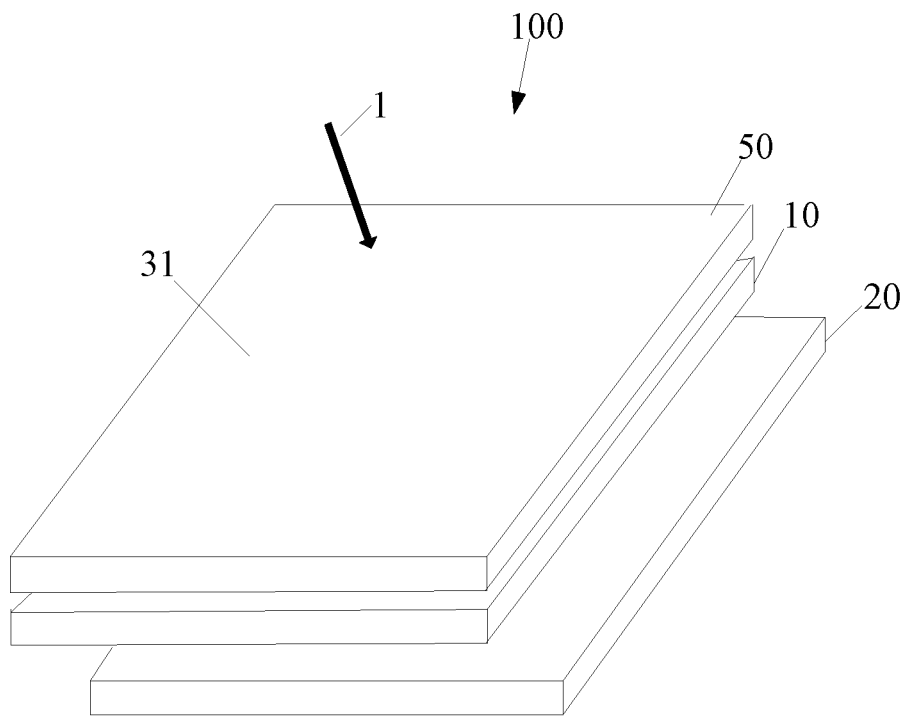
FIG. 6 is an illustrative structure diagram of a display module according to a fourth embodiment of the present invention.

As shown in FIG. 6, the structures of the first display unit 10 and the second display unit 20 in the display module 100 of the fourth embodiment are similar with those in the first embodiment, and the descriptions thereof will be omitted here.

The display module 100 of the fourth embodiment may comprise a first sensing unit 50, the first display unit 10 and the second display unit 20, wherein the first display unit 10 and the second display unit 20 are in parallel from top to bottom, and are arranged respectively in the first area and the second area, and the first sensing unit 50 is arranged in the third area. The first area is located between the second area and the third area, as shown in FIG. 5. The first sensing unit 50 may be set above the first display unit 10 with the third transmittance higher than the specific transmittance and used for sensing the operation of the operation body on the first image information and/or the second image information.

The display module 100 according to the fourth embodiment may sense by the first sensing unit 50 the operation of the operation body on the first image information of the first display unit 10, and may sense the operation of the operation body on the second image information of the second display unit 20 at the same time.

Hereinafter, the implementation of the first sensing unit 50 will be described in detail.

According to the structure of the display modules of the third embodiment and the fourth embodiment, the display modules may implement the touch control function. The operation controls contained in the image information displayed by respective display units of the display module may be controlled by the touch.

Figure 7:
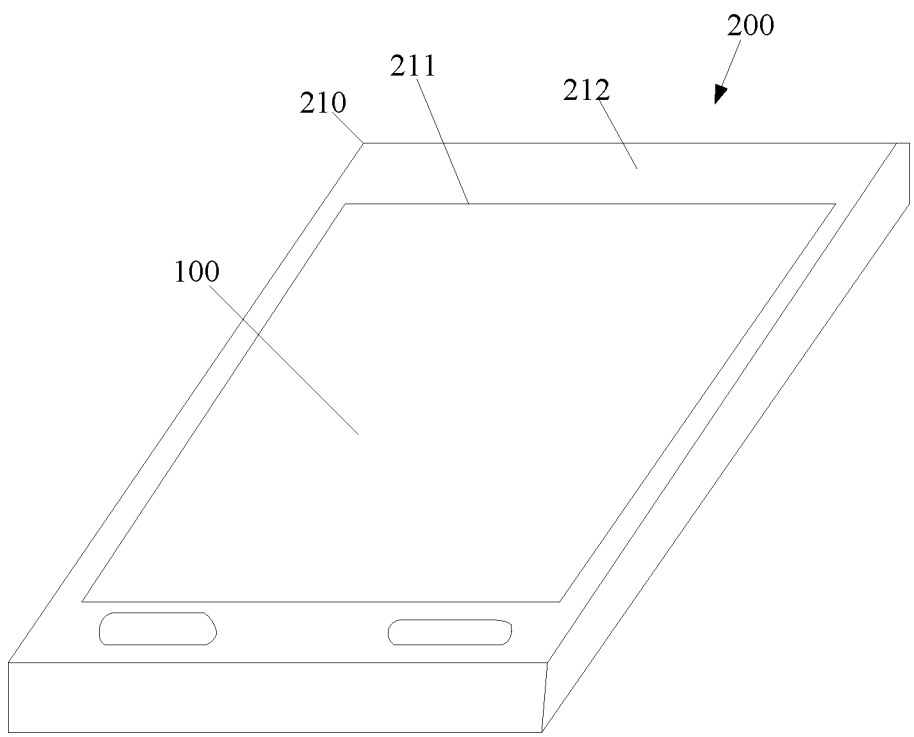
FIG. 7 is an illustrative structure diagram of a first outer space of the electronic device for displaying according to the first embodiment of the present invention.

Another aspect of the present invention also provides an electronic device having the above display module, whose structure is shown in FIG. 7. Referring to FIG. 7, the electronic device 200 according to the first embodiment of the present invention may comprise:

a housing 210 forming an accommodation space, the housing including a first outer surface 212 having a first opening 211;

a display module 100 disposed in the accommodation space of the housing 210 and the display module 100 comprising:

a first display unit 10 disposed in a first area of the accommodation space and located at the first opening 211, configured to display the first image information, wherein the first display unit has the first transmittance, and the first transmittance is higher than the specific transmittance;

a second display unit 20 disposed in a second area of the accommodation space, configured to display second image information, wherein the first light reflected by the second display unit or the second light generated by the second display unit is able to transmit through the first display unit 10.

The structure of the display module 100 may be illustrated as shown in FIG. 1. In the accommodation space of the housing 210, the first display unit 10 and the second display unit 20 are arranged from top to bottom in parallel with the first outer surface 212. The first display unit 10 is disposed at the first opening 211. When the user view the first image information displayed by the first display unit 10 above the first outer surface 212, the second image information displayed by the second display unit 20 may be viewed through the first sensing unit 30.

The structure of the display module 100 may also be illustrated as shown in FIG. 5. Besides the first display unit 10 and the second display unit 20, the display module 100 may further comprise:

the first sensing unit 30 disposed in the third area of the accommodation space and exposed via the first opening 211, wherein the first area is disposed between the second area and the third area, i.e., the first display unit 10 is disposed between the first sensing unit 30 and the second display unit 20, and the first sensing unit 30 has the third transmittance higher than the specific transmittance, and wherein the first sensing unit 30 is configured to sense the operation of the operation body on the first image information of the first display unit 10;

the second sensing unit 40 disposed in the fourth area of the accommodation space, wherein the second area is disposed between the first area and the fourth area, i.e., the second display unit 20 is disposed between the second sensing unit 40 and the first display unit 10, and wherein the second sensing unit 40 is configured to sense the operation of the operation body on the second image information of the second display unit 20.

The detailed structures of the first sensing unit 30 and the second sensing unit 40 may refer to the descriptions in the second embodiment of the display module according to the present invention.

Figure 8:
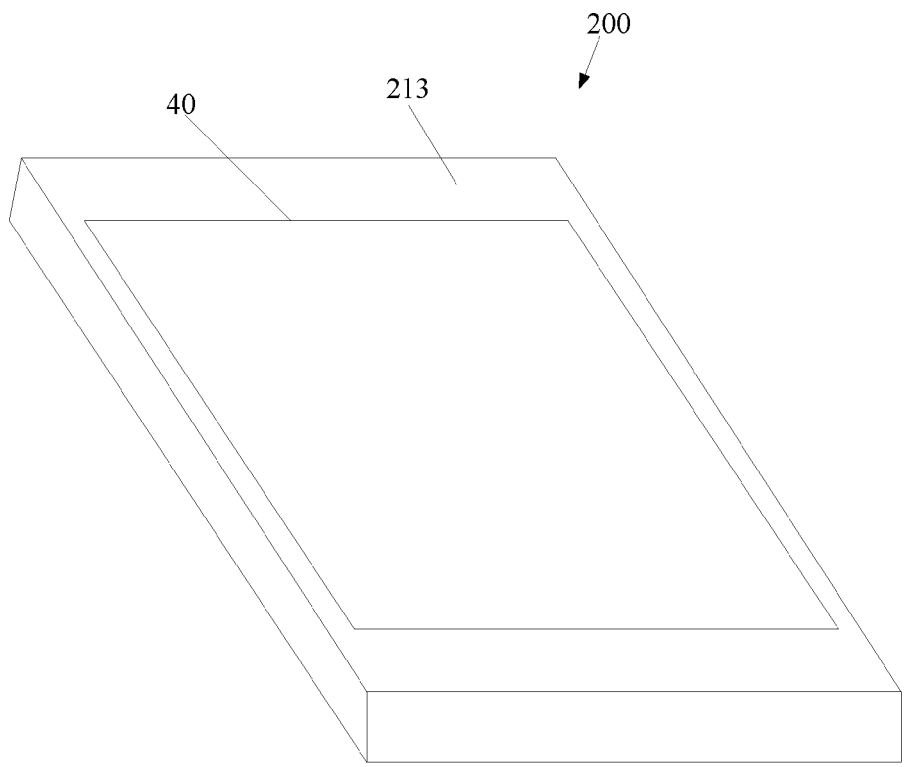
FIG. 8 is an illustrative structure diagram of a second outer space of the electronic device for displaying according to the first embodiment of the present invention.

As shown in an appearance structure of the second outer surface 213 of the housing in FIG. 8, the sensing surface of the first sensing unit 30 may be exposed via the first opening 211, the second sensing unit 40 may be arranged at the second outer surface 213 (which is opposite to the first outer surface 212) of the housing 210, and the sensing surface of the second sensing unit 40 may be joint to the second outer surface 213. The user may touch a part of the sensing surface of the first sensing unit 30 which is exposed by the first opening 211, so as to perform the touch operation on the first image information displayed by the first display unit 10; and may also touch a part of the second outer surface 213 jointed to the second sensing unit 40, so as to perform the touch operation on the second image information displayed by the second display unit 20.

Additionally, a second opening may be disposed on the second outer surface 213 of the housing 210, so as to expose the second sensing unit 40 via the second opening 213 of the second outer surface 213. The second sensing unit 40 has the second transmittance higher than the specific transmittance. As such, when the touch operation is performed, the user may view the second image information through the second sensing unit 40, and may perform the touch operation on the second image information displayed by the second display unit 20 more intuitively.

Therefore, when the display module 100 uses a structure of FIG. 5 (i.e., the third embodiment), the user may use the first sensing unit 30 and the second sensing unit 40 for implementing respective controls to the first display unit 10 and the second display unit 20.

In yet another aspect, the structure of the display module 100 in the electronic device 200 according to the first embodiment of the present invention may also be illustrated as shown in FIG. 6.

The display module 100 may only provided with the first sensing unit 50 disposed above the first display unit 10, and located at the first opening 211 of the housing 210. The first sensing unit 50 has the third transmittance higher than the specific transmittance. When the operation body touches the sensing surface of the first sensing unit 50 exposed via the first opening 211, the first sensing unit 50 may sense the operation of the operation body on the first image information, and may also sense the operation of the operation body on the second image information. That is, different touch control manners of the operation body on the first sensing unit 50 may be sensed, so that the first display unit 10 may change to display the third image information from the first image information in response to the touch operation; or the second display unit 20 may change to display the fourth image information from the second image information in response to the touch operation; or the first display unit 10 and the second display unit 20 may change image information simultaneously in response to the touch operation.

Hereinafter, the approach of implementing the touch control by the first sensing unit 50 will be described in detail.

In the embodiment of the present invention, the first sensing unit 50 may comprise:

a sensing component, configured to sense first position information on the first image information corresponding to the operation body and corresponding second position information on second first image information corresponding to the operation body. Referring to FIG. 6, when the user performs the touch operation on the sensing surface of the first sensing unit 50 using the operation body, the touch position of the operation body on the sensing surface of the first sensing unit 50 may have a corresponding first position on the first image information of the first display unit 10, and have a corresponding second position on the second image information of the second display unit 20. The sensing component may be used for sensing the first and the second position information;

a detection component, configured to detect control information of the operation body.

Additionally, the electronic device 200 may further comprise:

a control unit, the control unit in the electronic device being connected to the first sensing unit 50, and configured to determine a control object of the operation body according to the control information detected by the detection component, so that the control object may respond to the operation of the operation body on the first position information and/or the second position information.

In the first sensing unit 50, the method of detecting the control information of the operation body by the detection component may comprise:

A first approach in which the detection component may comprise a pressure sensing module configured to sense a pressure value of the operation body on the sensing surface of the first sensing unit 50. The control object of the operation body may be determined by the pressure value. Thus in this case, the control information detected by the detection component is the pressure value.

After the control unit obtains the pressure value detected by the detection component, when the control unit determines that the pressure value is larger than a preset pressure value, it may be determined that the control object of the operation body is the second image information of the second display unit 20, and then the control unit may enable the second display unit 20 to change to display the fourth image information from the second image information, in response to the operation of the operation control on the second position information, wherein the fourth image information is different from the second image information; and when the control unit determines that the pressure value is less than the preset pressure value, it may be determined that the control object of the operation body is the first image information of the first display unit 10, and then the control unit may enable the first display unit 10 to change to display the third image information from the first image information, in response to the operation of the operation control on the first position information, wherein the third image information is different from the first image information.

With the first sensing detection approach of the first sensing unit 50, when the pressure of the operation body on the sensing surface of the first sensing unit 50 is higher than the preset pressure value, it may be determined that the touch operation object of the operation body is the second display image of the second display unit; and when the pressure of the operation body on the sensing surface of the first sensing unit 50 is lower than the preset pressure value, it may be determined that the touch operation object of the operation body is the first display image of the first display unit.

A second approach in which the detection component may comprise an operation control detection module, configured to determine whether there are operation controls corresponding to the first position information and the second position information respectively. In this case, the control information is information indicating that an operation control exists. Here, the "operation control" may include display information, keys and menus etc. which may be linked for performing corresponding operations.

When the operation control detection module determines that there is an operation control corresponding to the first position information but there is not an operation control corresponding to the second position information, the control unit may determine that the control objection of the operation body is the first image information of the first display unit 10, and may enable the first display unit 10 to display the third image information in response to the operation control corresponding to the first position information, wherein the third image information is different from the first image information. Here, "no corresponding operation control" means that there is no key or menu etc. which may be linked for performing corresponding operations at the corresponding position. The case in which "the first position information has a corresponding operation control, while the second position information does not have a corresponding operation control" may be such a situation that the first position information includes an execution menu, while the second position information only includes a display image.

According to the embodiment of the present invention, when the first position information has the corresponding operation control while the second position information does not have the corresponding operation control, the control unit may enable the first display unit 10 to change to display the third image information from the first image information, in response to the operation control corresponding to the first position information. In this case, the image displayed by the second display unit 20 may also be changed in association, i.e. from displaying the second image information to displaying the fourth image information.

When the detection module determines that there is an operation control corresponding to the second position information but there is not an operation control corresponding to the first position information, the control unit may determine that the control object of the operation body is the second image information of the second display unit 20, and may enable the second display unit 20 to display the fourth image information, in response to the operation control corresponding to the second position information, wherein the fourth image information is different from the second image information.

According to the embodiment of the present invention, when the second position information has the corresponding operation control while the first position information does not have the corresponding operation control, the control unit may enable the second display unit 20 to change to display the fourth image information from the second image information, in response to the operation control corresponding to the second position information. In this case, the image displayed by the first display unit 10 may also be changed correspondingly, i.e. from displaying the first image information to displaying the third image information.

Furthermore, when the detection component determines that the first position information and the second position information have corresponding operation controls, e.g., the first position information includes an operation key, and the second position information also includes an operation key, i.e., the two operation keys are overlapped vertically, the control unit may determine that the control object of the operation body may be both the first image information of the first display unit 10 and the second image information of the second display unit 20. And, the control unit may enable the first display unit 10 to display the third image information, and enable the second display unit 20 to display the fourth image information, in response to operation controls corresponding to the first position information and the second position information respectively.

With the second sensing detection approach of the first sensing unit 50, the control object of the touch operation may be determined according to the fact whether there are corresponding operation controls at the touch positions of the operation body corresponding to the first position information and the second position information.

A third approach in which the detection component may comprise a mode determination module configured to determine whether a first selection mode or a second selection mode provided to the operator is selected. In this case, the control information indicates the selected mode.

In this case, the electronic device 200 may comprise a mode selection module configured for providing the first selection mode, the second selection mode or the third selection mode to the operator.

For example, the mode selection module may be a toggle switch on the electronic device, including three pressing gears for indicating the first selection mode, the second selection mode and the third selection mode respectively. Before the user performs the touch operation, he may press a corresponding gear on the toggle switch of the electronic device. The toggle switch may send a corresponding indication signal to the detection component, in response to the action. When different gears are pressed, different indication signals may be sent to the detection component, so that the detection component may detect, according to the indication signal, the operation mode into which the operator intends to enter.

When the detection module detects that the first selection mode of the mode selection module is selected, the control unit may determine that the control object of the operation body is the first image information on the first display unit 10, and may enable the first display unit 10 to display the third image information in response to the operation control corresponding to the first position information.

When the detection module detects that the second selection mode of the mode selection module is selected, the control unit may determine that the control object of the operation body is the second image information on the second display unit 20, and may enable the second display unit 20 to display the fourth image information in response to the operation control corresponding to the second position information.

When the detection module detects that the third selection mode of the mode selection module is selected, the control unit may determine that the control objects of the operation body are both the first image information and the second image information, and may enable the first display unit 10 to display the third image information and enable the second display unit 20 to display the fourth image information at the same time, in response to the operation control corresponding to the first position information and the operation control corresponding to the second position information simultaneously.

With the third sensing detection approach of the first sensing unit 50, before the touch operation, the user may perform a mode selection on the electronic device 200 in advance to determine on image information of which display unit(s) the touch operation needs to be performed, and then select a corresponding mode on the mode selection module.

The display module 100 of the electronic device 200 according to the embodiment of the present invention may be provided with the first sensing unit 50. The control information of the operation body on the first sensing unit 50 may be detected for determining the control object of the operation body. That is, it may be determined whether the first image information or the second image information or both the first image information and the second image information may be controlled by the operation body, so as to respond to the operation of the corresponding operation control(s).

In the embodiments of the present invention, the approach of detecting the control information of the operation body by the detection component is not limited to the above three approaches. The control object of the operation may also be determined by detection of touch areas, touch fingerprints etc., which are not described in detail here.

On the other hand, in the electronic device having the display module of the embodiment of the present invention, the image information displayed by the first display unit may be associated with the image information displayed by the second display unit. For example, when the control object of the touch operation is determined to be the first image information of the first display unit, the control unit enables the first display unit to display the third image information in response to the operation control at the first position information. Since the image information displayed by the first and the second display unit are associated with each other, the second display unit may also change image information at this time from displaying the second image information to displaying the fourth image information.

Similarly, when the control object is determined to be the second image information of the second display unit, the control unit enables the second display unit to display the fourth image information in response to the operation control at the second position information. The first display unit displays the third image information, wherein the third image information is associated with the fourth image information.

On the other hand, in the electronic device having the display module of the embodiment of the present invention, the sensing unit and the display unit may be disposed separately. In the display module 100 of the third embodiment as shown in FIG. 5, the first sensing unit 30 and the first display unit 10 are disposed independently, and the second sensing unit 40 and the second display unit 20 are disposed independently. Similarly, in the display module 100 of the fourth embodiment as shown in FIG. 6, the first sensing unit 50 is disposed separately from the first display unit 10 and the second display unit 20.

The sensing unit of the display module 100 according to respective embodiments above may be a resistance-sensitive structure, or a capacitance-sensitive structure. Both the sensing units of the resistance-sensitive structure and the capacitance-sensitive structure may be made of light-transmittance materials to form a sensing unit with a certain transmittance so as to satisfy the design usage requirement of the display module according to the present invention.

According to another aspect of the embodiment of the present invention, the sensing unit may also form a structure combined with the display unit, in order to reduce a thickness of the display module 100. Therefore, the embodiment of the present invention further provides the electronic device of the second embodiment as shown in FIGS. 7 and 8. The electronic device may comprise:

a housing forming an accommodation space, the housing including a first outer surface having a first opening;

a first display sensing unit disposed in a first area of the accommodation space and located at the first opening, configured to display first image information and sensing an operation of an operation body on the first image information, wherein the first display sensing unit has a fifth transmittance higher than a specific transmittance;

a second display unit disposed in a second area of the accommodation space, configured to display second image information, wherein a first light reflected by the second display unit or a second light generated by the second display unit is able to transmit through the first display unit.

According to the second embodiment, the second image information presented on the second display unit may transmit through the first display sensing unit, so that the user may view the second image information presented on the second image unit while viewing the first image information presented on the first display sensing unit.

The first display sensing unit may further have a touch-sensitive function besides the image display function. The operator may perform the touch control to the first image information. Also, the first image information and the second image information may be associated with each other. The second image information of the second display unit may vary with the touch control to the first image information.

In another aspect of the electronic device according to the second embodiment of the present invention, a second sensing unit may be disposed separately in the third area, i.e., under the second display unit. The second display unit may be used for sensing the touch operation of the operation body on the second image information of the second display unit.

Figure 9:
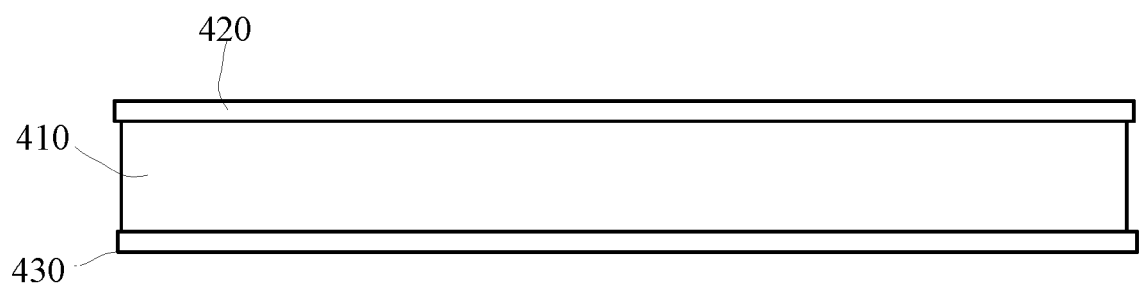
FIG. 9 is an illustrative structure diagram of a first display sensing unit in the electronic device according to the second embodiment of the present invention.

FIG. 9 is an illustrative structure diagram of the first display sensing unit in the electronic device according to the second embodiment of the present invention. As shown in FIG. 9, the first display sensing unit may comprise:

a first display component 410 configured to display the first image information, the first display component having a first transmittance higher than the specific transmittance;

a first sensing component configured to sense the operation of the operation body on the first image information, the first sensing component having a third transmittance higher than the specific transmittance, wherein the first sensing component comprises a first sensing layer 420 and a second sensing layer 430 parallel to the first sensing layer, and the first display component 410 is disposed between the first sensing layer 420 and the second sensing layer 430.

Figure 10:
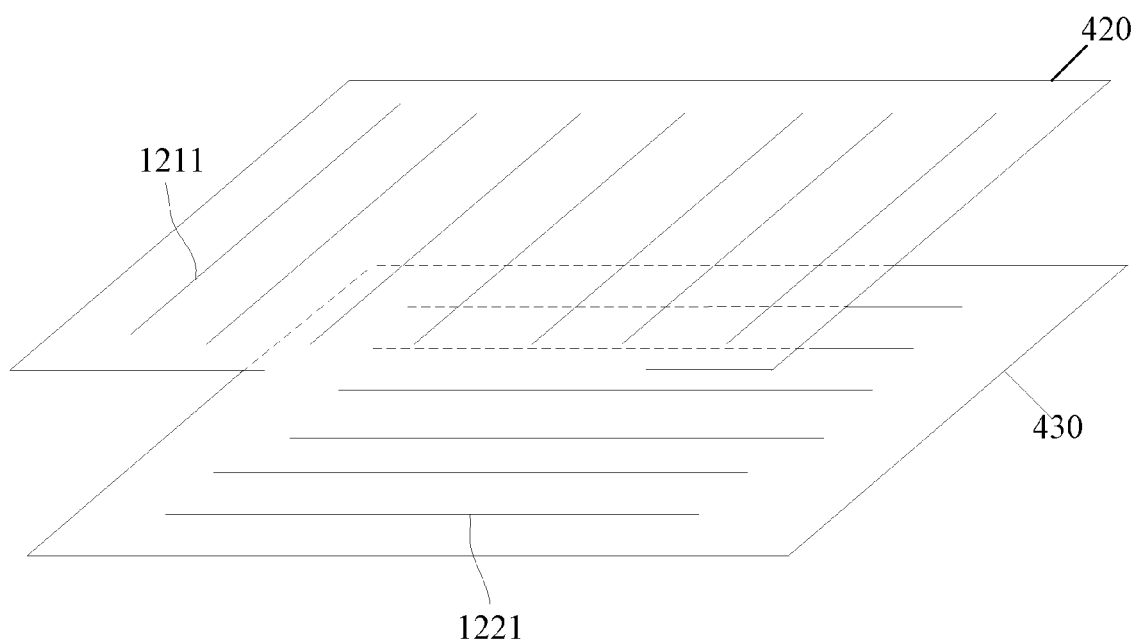
FIG. 10 is an illustrative structure diagram of a sensing component in the first display sensing unit as shown in FIG. 9.

The first sensing component may be formed to be multi-point type structure, as shown in FIG. 10. A plurality of non-intersecting first sensing lines 1211 may be arranged on the first sensing layer 420, and a plurality of non-intersecting second sensing lines 1221 may be arranged on the second sensing layer 430. Projection lines of the first sensing lines 1211 projected to the second sensing layer 430 may be intersected with the second sensing lines 1221, or projection lines of the second sensing lines 1221 projected to the first sensing layer 420 may be intersected with the first sensing lines 1211, forming mutual capacitance at which rows and columns are intersected, i.e., coupling capacitance.

With the above structure, when the operator touches the sensing surface of the first sensing component, the mutual capacitance at corresponding positions on the first sensing layer 420 and the second sensing layer 430 of the first sensing component may be varied. Therefore, an existence of touch and the positions of respective touch points may be determined accurately.

Additionally, the first sensing line 1211 and the second sensing line 1221 may not be limited to include sensing lines in parallel. The first sensing line 1211 and the second sensing line 1221 may be bending respectively, as long as the projection lines of respective first sensing lines 1211 on the second sensing surface 122 are intersected with the second sensing lines 1221 respectively, and the projection lines of respective second sensing lines 1221 on the first sensing surface 420 are intersected with the first sensing lines 1211 respectively Therefore, when the electronic device according to the second embodiment of the present invention uses the sensing component as shown in FIG. 10, the display unit and the sensing component may be combined in a single structure unit, constructing the first display sensing unit as shown in FIG. 9.

Similarly, in the electronic device according to the second embodiment of the present invention, the second display unit and the sensing component may also be combined in a single structure unit, constructing the second display sensing unit.

Therefore, the present invention may further provide an electronic device of the third embodiment, comprising: a housing forming an accommodation space, the housing including a first outer surface having a first opening;

a first display sensing unit disposed in a first area of the accommodation space and located at the first opening, comprising:

a first display component configured to display first image information, the first display component having a first transmittance higher than a specific transmittance;

a first sensing unit configured to sense an operation of an operation body on the first image information, wherein the first sensing component has a third transmittance higher than the specific transmittance, the first sensing component comprises a first sensing layer and a second sensing layer parallel to the first sensing layer, and the first display component is disposed between the first sensing layer and the second sensing layer;

a second display sensing unit disposed in a second area of the accommodation space, comprising:

a second display component configured to display second image information, wherein a first light reflected by the second display unit or a second light generated by the second display unit is able to transmit through the first display sensing unit;

a second sensing component configured to sense an operation of the operation body on the second image information, wherein the second sensing component comprises a third sensing layer and a fourth sensing layer parallel to the third sensing layer, and the second display component is disposed between the third sensing layer and the fourth sensing layer.

With respect to the description of the display module according to the third embodiment of the present invention, the second display sensing unit may have a sixth transmittance higher than the specific transmittance. The second display component may have the second transmittance higher than the specific transmittance, and the second sensing component may have the transmittance higher than the specific transmittance. The second display sensing unit may be disposed at the second opening of the second outer surface of the electronic device, and displayed via the second opening, so that the user may perform the touch operation according to the directly viewed image information displayed by the second display unit.

Figure 11:
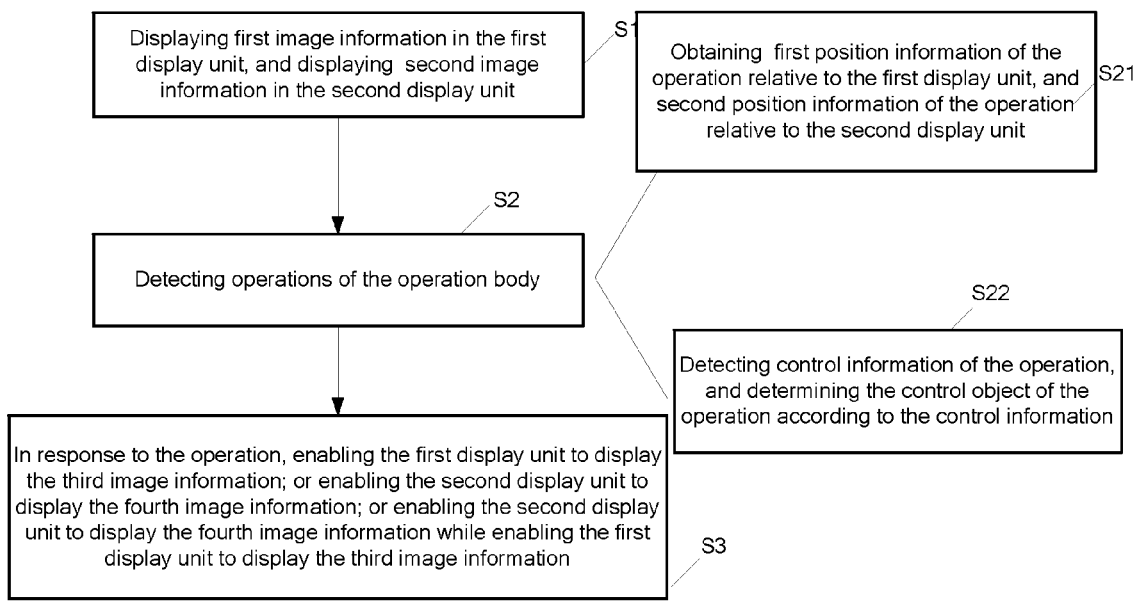
FIG. 11 is an illustrative flow chart of a display control method according to an embodiment of the present invention.

The embodiment of the present invention further provides a display control method of the display module 100 according to the embodiment of the present invention. As shown in FIG. 11, the method may comprise steps of:

S1, displaying first image information on a first display unit, and displaying second image information on a second display unit, wherein the first display unit has a first transmittance higher than a specific transmittance, and a first light reflected by the second display unit or a second light generated by the second display unit is able to transmit through the first display unit;

S2, detecting an operation of an operation body;

S3, enabling the first display unit to display third image information in response to the operation, wherein the third image information is different from the first image information; or enabling the second display unit to display fourth image information, wherein the fourth image information is different from the second image information; or enabling the second display unit to display the fourth image information, while enabling the first display unit to display the third image information.

With the display control method of the embodiment of the present invention, the electronic device only needs to be provided with one sensing component, which may also sense touch operations of the operation body on the two different display units. According to different operation approaches of the operation body, different display units may be enabled to respond to the operations of the operation body.

In step S2, the step of detecting the operation of the operation body may comprise steps of:

S21, obtaining first position information of the operation relative to the first display unit, and second position information of the operation relative to the second display unit;

S22, detecting control information of the operation, and determining an control object of the operation according to the control information.

In step S3, the step of responding to the operation comprises steps of:

enabling the first display unit to display the third image information, when the control object is determined to be the first display unit;

enabling the second display unit to display the fourth image information, when the control object is determined to be the second display unit;

enabling the second display unit to display the fourth image information while enabling the first display unit to display the third image information, when the control objects are determined to be the first display unit and the second display unit.

In step S22, the step of detecting the control information of the operation and determining the control object of the operation according to the control information comprises steps of:

obtaining mode selection action information of an operator, and determining whether a first selection mode or a second selection mode of the operator is selected, the control information indicating the selected mode;

determining the control object to be the first display unit, when the first selection mode is selected, determining the control object to be the second display unit, when the second selection mode is selected;

determining the control objects to be the first display unit and the second display unit, when the third selection mode is selected.

With the above detection approach, the electronic device may preset a mode selection module configured for providing the first selection mode, the second selection mode and the third selection mode to the operator. The mode selection module may be the toggle switch on the electronic device. Before the user performs the touch operation, an operation mode to be switched may be selected by the mode selection module of the electronic device.

Additionally, the display control method according to the embodiment of the present invention may detect the control information of the operation, and determine the control object of the operation according to the control information. A pressure detection method or an operation control detection method may be possible. The implementations thereof may refer to the descriptions on the electronic device 200 having only the first sensing unit 50 according to the first embodiment.

On the other hand, in step S3, the step of responding to the operation may comprise steps of:

enabling the first display unit to display the third image information while enabling the second display unit to display the fourth image information, when the control object is determined to be the first display unit, wherein the third image information is associated with the fourth image information;

enabling the second display unit to display the fourth image information while enabling the first display unit to display the third image information, when the control object is determined to be the second display unit, wherein the third image information is associated with the fourth image information.

With the above approach, the images displayed by the first display unit and the second display unit are associated with each other. The image displayed by the second display unit may be varied as the image displayed by the first display unit is controlled. Similarly, the image displayed by the first display unit may be varied as the image displayed by the second display unit is controlled.

At least one of the above technical solutions according to the embodiments of the present invention may have beneficial effects as follows:

the electronic device may be provided with a first display unit and a second display unit which are stacked, and may display via one and the same display window on the electronic device so as to display different contents respectively on different display units in different frequencies, brightness, contrasts, colors, and thus to achieve different display effects;

a display module may be provided with multiple layers of display units, and may have a touch-sensitive operation function. Even if only one sensing components is arranged, it may still sense touch operations of an operation body on two different display units. According to different operation manners of the operation body, different display units may be enabled to respond to the operations of the operation body.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

What is claimed is:

1. An electronic device, comprising:
a housing forming an accommodation space, the housing including a first outer surface having a first opening;
a display module disposed in the accommodation space and comprising:
a first display unit disposed in a first area of the accommodation space and located at the first opening, configured to display first image information, wherein the first display unit has a first transmittance, and the first transmittance is higher than a specific transmittance;
a second display unit disposed in a second area of the accommodation space, configured to display second image information, wherein a first light reflected by the second display unit or a second light generated by the second display unit is able to transmit through the first display unit;
a first sensing unit disposed in a third area of the accommodation space, wherein the first area is disposed between the second area and the third area, the first sensing unit being configured to sense an operation of an operation body on the first image information, and/or sense an operation of the operation body on the second image information, and the first sensing unit comprising:
a sensing component configured to sense corresponding first position information of the operation body on the first image information and corresponding second position information of the operation body on the second image information; and
a detection component configured to detect control information of the operation body; and
a control unit configured to determine a control object according to the control information, so as to allow the control object to respond to an operation of the operation body on the first position information and/or the second position information;
wherein the detection component comprises a pressure sensing module configured to sense a pressure value of the operation body, the control information being the pressure value; and
wherein the control unit determines whether the pressure value is larger than a preset pressure value, enables the second display unit to display fourth image information in response to the operation on the second position information when the pressure value is larger than the preset pressure value, wherein the fourth image information is different from the second image information, and enables the first display unit to display third image information in response to the operation on the first position information when the pressure value is less than the preset pressure value, wherein the third image information is different from the first image information.

2. The electronic device according to claim 1, wherein the first sensing unit is exposed via the first opening, and the first sensing unit has a third transmittance higher than the specific transmittance, and wherein the first sensing unit is configured to sense an operation of the operation body on the first image information, and wherein the electronic device further comprises:
a second sensing unit disposed in a fourth area of the accommodation space, wherein the second area is disposed between the first area and the fourth area, and wherein the second sensing unit is configured to sense an operation of the operation body on the second image information.

3. The electronic device according to claim 2, wherein the housing comprises a second outer surface having a second opening, and the second sensing unit is exposed via the second opening; and wherein the second display unit has a second transmittance higher than the specific transmittance, and the second sensing unit has a fourth transmittance higher than the specific transmittance.

4. The electronic device according to claim 1, wherein the detection component comprises an operation control detection module, configured to determine whether there are operation controls corresponding to the first position information and the second position information respectively, the control information being information indicating that an operation control exists; and
when the operation control detection module determines that there is the operation control corresponding to the first position information but there is no operation control corresponding to the second position information, the control unit enables the first display unit to display the third image information in response to the operation control corresponding to the first position information, wherein the third image information is different from the first image information;
when the operation control detection module determines that there is the operation control corresponding to the second position information but there is no operation control corresponding to the first position information, the control unit enables the second display unit to display the fourth image information in response to the operation control corresponding to the second position information, wherein the fourth image information is different from the second image information.

5. The electronic device according to claim 1, wherein the detection component comprises a mode determination module configured to determine which of a first selection mode and a second selection mode provided to the operator is selected, the control information indicating the selected mode;
wherein when the mode determination module determines that the first selection mode is selected, the control unit enables the first display unit to display the third image information in response to the operation control corresponding to the first position information, wherein the third image information is different from the first image information;
wherein when the mode determination module determines that the second selection mode is selected, the control unit enables the second display unit to display the fourth image information in response to the operation control corresponding to the second position information, wherein the fourth image information is different from the second image information.

6. A display control method, comprising steps of:
- displaying first image information on a first display unit, and displaying second image information on a second display unit, wherein the first display unit has a first transmittance higher than a specific transmittance, and a first light reflected by the second display unit or a second light generated by the second display unit is able to transmit through the first display unit;
- detecting an operation of an operation body;
- sensing a pressure value of the operation body and determining whether the pressure value is larger than or less than a preset pressure value;
- enabling the first display unit to display third image information in response to the operation when the pressure value is less than the preset pressure value, wherein the third image information is different from the first image information; and
- enabling the second display unit to display fourth image information when the pressure value is larger than the preset pressure value, wherein the fourth image information is different from the second image information.

7. The display control method according to claim 6, wherein the step of detecting the operation of the operation body comprises steps of:
- obtaining first position information of the operation relative to the first display unit, and second position information of the operation relative to the second display unit; and
- detecting control information of the operation, and determining an control object of the operation according to the control information.

8. The display control method according to claim 7, wherein the step of responding to the operation comprises steps of:
- enabling the first display unit to display the third image information, when the control object is determined to be the first display unit;
- enabling the second display unit to display the fourth image information, when the control object is determined to be the second display unit; and
- enabling the second display unit to display the fourth image information while enabling the first display unit to display the third image information, when the control objects are determined to be the first display unit and the second display unit.

9. The display control method according to claim 7, wherein the step of detecting the control information of the operation and determining the control object of the operation according to the control information comprises steps of:
- obtaining mode selection action information of an operator, and determining which of a first selection mode and a second selection mode of the operator is a selected mode, the control information being the selected mode;
- determining the control object to be the first display unit, when the first selection mode is the selected mode;
- determining the control object to be the second display unit, when the second selection mode is the selected mode; and
- determining the control objects to be the first display unit and the second display unit, when both the first selection mode and the second selection mode are the selected modes.

10. The display control method according to claim 7, wherein the step of responding to the operation comprises steps of:
- enabling the first display unit to display the third image information while enabling the second display unit to display the fourth image information, when the control object is determined to be the first display unit, wherein the third image information is associated with the fourth image information; and
- enabling the second display unit to display the fourth image information while enabling the first display unit to display the third image information, when the control object is determined to be the second display unit, wherein the third image information is associated with the fourth image information.

* * * * *